United States Patent
Nishimoto et al.

(10) Patent No.: US 6,528,012 B2
(45) Date of Patent: Mar. 4, 2003

(54) WELDED STRUCTURE MADE OF LOW THERMAL EXPANSION COEFFICIENT ALLOY AND WELDING MATERIAL THEREFORE

(75) Inventors: Kazutoshi Nishimoto, Suita (JP); Naoshige Kubo, Osaka (JP); Hiroshi Iwahashi, Osaka (JP); Shuji Yamamoto, Osaka (JP); Hidefumi Yamanaka, Osaka (JP); Shinji Koga, Kobe (JP); Yutaka Chida, Suita (JP); Taketo Yamakawa, Kakogawa (JP); Kouji Michiba, Kobe (JP); Hiroyuki Hirata, Osaka (JP); Kazuhiro Ogawa, Osaka (JP); Toshinobu Nishibata, Osaka (JP)

(73) Assignees: Sumitomo Metal Industries, Ltd., Osaka (JP); Osaka Gas Co., Ltd., Osaka (JP); Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/820,862

(22) Filed: Mar. 30, 2001

(65) Prior Publication Data

US 2002/0011287 A1 Jan. 31, 2002

Related U.S. Application Data

(63) Continuation of application No. PCT/JP99/01743, filed on Apr. 1, 1999.

(30) Foreign Application Priority Data

Oct. 2, 1998 (JP) ............................................. 10-281628
Nov. 9, 1998 (JP) ............................................. 10-318196

(51) Int. Cl.[7] .......................... C22C 38/08; C22C 30/00
(52) U.S. Cl. .......................... 420/94; 420/95; 148/336; 428/681; 428/682; 428/683
(58) Field of Search .................... 420/94, 95; 148/336; 428/682, 683, 681

(56) References Cited

U.S. PATENT DOCUMENTS 3,184,577 A    5/1965    Witherell
5,304,346 A  * 4/1994    O'Donnell et al. ......... 148/336

FOREIGN PATENT DOCUMENTS

JP    60177164    9/1985
JP    4231194    8/1992

(List continued on next page.)

OTHER PUBLICATIONS

Seitetsu Kenkyu, No. 318, 1985, "Weldability of Invar and Its Large Diameter Pipe".

(List continued on next page.)

*Primary Examiner*—Deborah Yee
(74) *Attorney, Agent, or Firm*—Burns, Doane, Swecker & Mathis, LLP

(57) ABSTRACT

In a welded structure and welded pipe, having members joined to each other by welding wherein, at least one of the members is formed of Fe—Ni-base low thermal expansion coefficient alloy, there is provided a welded structure and welded pipe having a weld metal free from cracking and achieving an excellent toughness and stress corrosion cracking resistance. Further, a welding material is provided which can form such a weld metal and is excellent in workability and weldability in fabrication. The weld metal comprises, on the weight % basis, Ni: 30 to 45%, Co: 0 to 10%, C: 0.03 to 0.5%, Mn: 0.7% or less, either one of or the total of Nb and Zr: 0.05 to 4%, and rare earth element: 0 to 0.5%, with impurities being P: 0.02% or less, Al: 0.01% or less, and oxygen: 0.01% or less, wherein each of Si and S satisfies the following formulas ① and ②, where each element symbol in the following formulas ① and ② indicates the content (weight %) of each element.

$Si \leq 0.1(Nb+Zr)+0.05\%$      ①

$S \leq 0.0015(Nb+Zr)+0.0055\%$      ②

9 Claims, 4 Drawing Sheets

FOREIGN PATENT DOCUMENTS

| | | | | |
|---|---|---|---|---|
| JP | 7267272 | 10/1995 | | |
| JP | 08-215879 | 8/1996 | | |
| JP | 8267272 | 10/1996 | | |
| JP | 408267272 A | * 10/1996 | ........... | C22C/38/12 |
| JP | 411104885 A | * 4/1999 | ........... | C22C/38/00 |
| WO | 0020160 | 4/2000 | | |

OTHER PUBLICATIONS

W.E. Clautice, "Welding Vacuum Jacketed Piping at the Kennedy Space Center", Welding Journal, pp. 500–509, Jul. 1975.

* cited by examiner

WELDED STRUCTURE MADE OF LOW THERMAL EXPANSION COEFFICIENT ALLOY AND WELDING MATERIAL THEREFORE

This application is a continuation of International Application No. PCT/JP99/01743, filed Apr. 1, 1999, and designating the U.S., and published by the International Bureau in Japanese on Apr. 13, 2000.

FIELD OF THE INVENTION

The present invention relates to an article serving as storage tanks, pipelines, and various equipments associated with them for cryogenic substances, such as liquefied natural gas (LNG), in which all or part of members of the article are formed of a Fe—Ni low thermal expansion coefficient alloy and are assembled by welding. (Such an article will be collectively referred to as "welded structure" herein.) The present invention also relates to a welded pipe used in the above pipelines. Furthermore, the present invention relates to a welding material (wire) suitable for use in manufacturing the welded structure and the welded pipe as described above.

BACKGROUND OF THE INVENTION

Heretofore, austenitic stainless steels, such as JIS-SUS 304, have been used as a material of storage tanks and pipelines for cryogenic substances, such as the liquefied natural gas (LNG). However, the austenitic stainless steel has a high thermal expansion coefficient. Thus, for example in the pipeline, it is required to measure for absorbing the deformation due to expansion and contraction by interposing a loop pipe for each given length of the pipeline. If the pipeline can be formed of a material having a remarkably low thermal expansion coefficient which allows the loop pipe to be eliminated, an elbow pipe involved in the loop pipe will become unnecessary and thereby the diameter of a tunnel for letting the pipeline pass through will be able to be reduced. This will allow maintenance operations for thermal insulations of the pipeline or the like to be minimized, and will open the way to significantly economize construction costs and operation-maintenance expenses.

Among materials available for the transport or storage equipment of cryogenic substances, such as LNG, in view of mechanical and chemical properties thereof, it is known that a Fe—Ni alloy of a particular component ratio has an extremely low linear expansion coefficient. Typical examples of such an alloy are Fe—36% Ni alloy and Fe—42% Ni alloy, which are collectively referred to as Invar alloy ("%" concerning each content of components means "weight %" herein). These alloys are used as a material for equipment in which the expansion, and/or contraction due to temperature variation, is undesirable.

When a structure formed of the above Fe-Ni low thermal expansion coefficient alloy is assembled by welding, it is desireable to apply a welding material having a linear expansion coefficient similar to that of the base material. Thus, there are proposed some welding materials similar to the base metal, which are disclosed in Japan patent Laid-Open Publication No. 4-231194 and Japanese Patent Laid-Open Publication No. 8-267272 for example.

The welding material disclosed in the above Japanese Patent Laid-Open Publication No. 4-231194 includes C: 0.05 to 0.5% and Nb: 0.5 to 5% as well as Ni (Co) and Fe, and, as needed, selectively includes Mn, Ti, Al, Ca, Mg, Si, Cu, Ag, B, Sn, and Zn, whereby cracking in welding operations can be prevented.

The welding material disclosed in the Japanese Patent Laid-Open Publication No. 8-267272 includes Ni: 30 45%, C:0.03 to 0.3%, Nb: 0.1 to 3%, P:0.015% or less, S:0.005% or less, Si: 0.05 to 0.6%, Mn: 0.05 to 4%, Al: 0.05% or less, and O (oxygen): 0.015% or less, wherein the relationship between Nb and C is defined by (%Nb) × (%C) $\geq$ 0.01, whereby the reheat cracking in the multi-layer welding operation is prevented and the toughness of the welded zone is also improved.

However, when the above proposed welding materials are applied to assemble a large size structure, particularly to the structure of pipelines, storage tanks or the like for the liquefied natural gas, the following problems arise; various alloying elements, such as Nb, Ti, Ce, Mg, B, Ca et al., included in these welding materials, deteriorate workability of the alloy, resulting in a complicated manufacturing process of a welding material (wire). In particular, Nb contributes to the creation of a large size of oxide, resulting in not only deteriorated hot-workability, but also deteriorated cold-workability. Even if a welding material is successfully produced, the following problems remain.

When welded structures, such as pipelines or storage tanks for liquefied natural gas, are assembled, in view of the efficiency of operations and the quality of welded zones, it is desired that it is capable of automatic welding based on the TIG or plasma welding process and of welding in various positions for on-site operations. That is, the welding material is required to have an excellent weldability in fabrication. Specifically, in automatic welding, it is required not to allow weld defects to arise, such as incomplete formation of root pass bead or lack of fusion cased by insufficient weld penetration or missing of a weld line straightness, and not to allow burn though or lack of penetration in root pass to arise even during the welding in an overhead position.

The proposed welding materials described above were developed under consideration for improving welded joint properties, such as cracking resistance and toughness. However, the aforementioned workability and weldability in fabrication of the welding material were left out of view.

The welding materials disclosed in the Japanese Patent Laid-Open Publication No. 4-231194 were invented under consideration of the solidification cracking in welding operations. However, it does not discuss any measure for the reheat cracking arising in a multi-layer welding operation for a thick member, such as a large size structure. Further, despite of the necessity that the region, which contacts to liquefied natural gas, should have a sufficient toughness under very low temperature, i.e., −196° C., this point is also left out of view.

The term "solidification cracking" means a cracking which arises in a weld metal (bead) during solidification. The term "reheat cracking" means a cracking which arises in an initially formed weld metal (bead), which originally had no cracking, by a thermal affection at the time when the initially formed weld metal is reheated by an additional weld metal superposed thereon.

While a measure against the reheat cracking was also considered in the Japanese Patent Laid-Open Publication No. 8-267272, an effect of preventing the reheat cracking is not always sufficiently provided only by arranging the chemical composition of the welding material because a certain dilution of the alloy components due to the welding methods or groove shapes used in welding operations is involved. Thus, it is difficult to actually apply this welding material for structures handling cryogenic substances, such as the liquefied natural gas.

In these structures, such as storage equipment and pipelines for LNG, intended for handling the cryogenic substances, the weld metal is required to have an adequate stress corrosion cracking resistance, as well as toughness under a low temperature, as described above. This is required because the above structures are often coated with a an insulating material (thermal insulator), such as urethane resin, which includes a small amount of Cl$^-$, and these structures are often situated close to an ocean and exposed to the atmosphere containing Cl$^-$ due to sea water.

The above invention disclosed in the Japanese Patent Laid-Open Publication No. 8-267272 has an objective to improve the cold toughness of welded zone. However, it does not discuss any measure for the stress corrosion cracking resistance.

In the meantime, the welding material used for fabricating the above welded structure is required to be readily produced, or to be readily converted into a wire (i.e. required to have good workability), and is also required to facilitate welding operations when such a material is applied (i.e. required to have good welding weldability in fabrication).

For manufacturing of welding materials, i.e., welding wires, a hot working of raw materials and a cold working for wire drawing are essential. As described above, the welding materials proposed until the present time have an inferior workability, resulting in a complexified process for converting into wires and also an increased manufacturing cost.

In assembling operations for a large size of welded structure, such as storage tanks or pipelines for LNG, an automatic welding based on the TIG or plasma welding process is applied to enhance the efficiency of operations. In addition, it is required to provide an excellent weldability in fabrication, such as a capability of welding in various positions, because such assembling operations are often carried out on site. Specifically, it is required not to allow weld defects to arise, such as the incomplete formation of root pass bead, or lack of fusion caused by insufficient weld penetration, or missing of a weld line in the automatic welding operation, and not to allow the burn through or incomplete formation of root bead to arise during the welding operation in the overhead position. However, such requirements have not been considered in the welding materials proposed until this time.

SUMMARY OF THE INVENTION

It is the primary objective of the present invention to provide a welded structure and welded pipe having the following features ① to ③;

① no solidification cracking and no reheat cracking in a weld metal,

② excellent cold toughness of a weld metal, and

③ 3 excellent stress corrosion cracking resistance of a weld metal.

It is the second objective of the present invention to provide a welding material which is capable of forming a weld metal having the above features ① to ③ and which also has the following properties;

④ excellent in_workability, i.e., easily converted into wires, and

⑤ excellent in weldability in fabrication, i.e., excellent capability of providing a sound welded joint through automatic welding in all positions.

The welded structure of the present invention has members joined to each other by welding, and at least one of the members is formed of a Fe—Ni-base low thermal expansion coefficient alloy. The welded structure is characterized by the following (A) and (B);

(A) A weld metal of the welded structure comprises, on the weight % basis, Ni: 30 to 45%, Co: 0 to 10%, C: 0.03 to 0.5%, Mn: 0.7% or less, either one of or the total of Nb and Zr: 0.05 to 4%, and rare earth element: 0 to 0.5%, P as an impurity: 0.02% or less, Al as an impurity: 0.01% or less, and oxygen as an impurity: 0.01% or less.

(B) Each of Si and S in said weld metal satisfying the following formulas ① and ② where each element symbol in the following formulas ① and ② indicates the content (weight %) of each element;

$$Si \leq 0.1(Nb+Zr)+0.05\% \qquad ①$$

$$S \leq 0.0015(Nb+Zr)+0.0055\% \qquad ②$$

The welded pipe of the present invention is produced by shaping a plate of Fe—Ni-base low thermal expansion coefficient alloy in tubular shape and then welding its abutting portions. This pipe is used primarily in a pipeline for low temperature cryogenic substances. The pipeline is assembled by circumferential butt welding_of plural pipes. The term "welded pipe" also includes a pipe joint, such as a branch tube or an elbow, applied in a particular portion of the pipeline, as long as such a pipe joint is produced by welding.

The welded pipe of the present invention also has said features (A) and (B). Preferably, in the weld metal of the welded structure or welded pipe, a carbide existing in columnar crystal grain boundaries is 0.5 to 50 volume % of the weld metal, wherein Nb and/or Zr in said carbide is 20 weight % or more % of said carbide.

The welding material of the present invention is suitable to be used for forming a weld metal of Fe—Ni low thermal expansion coefficient alloy, and is characterized by the following features (C) and (D);

(C) The material is a Fe-base alloy comprising, on the weight % basis, C: 0.5% or less, Ni: 30 to 45%, Co: 0 to 10 %, Mn: 0.7% or less, either one of or the total of Nb and Zr: 0.2 to 4%, and rare earth element(s): 0 to 0.5%, P as an impurity: 0.02% or less, Al:0.01% or less, and oxygen: 0.01% or less.

(D) Each of Si, Nb, Zr, S, C, Mn, O (oxygen) and Al in said welding material satisfies the following formulas ① to ⑥

$$Si \leq 0.1(Nb+Zr)+0.05\% \qquad ①$$

$$S \leq 0.0015(Nb+Zr)+0.0055\% \qquad ②$$

$$C \geq 0.015(Nb+Zr)+0.04\% \qquad ③$$

$$0.1 \leq (Si/Mn) \leq 2 \qquad ④$$

$$S+O \leq 0.015\% \qquad ⑤$$

$$Al+O \leq 0.015\% \qquad ⑥$$

where each element symbol in the above formulas ① to ⑥ indicates the content (weight %) of each element.

The inventors have intimately researched factors of cracking in a weld metal, which arises during multi-layer welding in a structure made of Fe—Ni low thermal expansion coefficient alloy; cold toughness and stress corrosion cracking resistance of the weld metal; and workability and weldability in fabrication of a welding material. The present invention has been accomplished based on various new knowledge as described below obtained from these researches.

(1) Solidification Cracking and Reheat Cracking of Weld Metal

The inventors have intimately researched the fracture surface of the weld metal, in which solidification cracking and reheat cracking existed. As a result, the following facts have been learned.

(a) The fracture surface of the solidification cracking includes a significant trace of fusion. The fracture surface includes concentrated Si and C thereon.

(b) The fracture surface of the reheat cracking includes, similar to the solidification cracking surface, a potion having concentrated Si and C, and another portion showing a flat intergranular fracture having concentrated S.

Based on these facts, the solidification cracking could be explained as a phenomenon in which the weld metal had a portion where a liquid phase of the concentrated Si and C resided for a long time and then the weld metal was cracked at said portion under a certain external force. It was also believed that the reheat cracking was caused by two factors; Si and C forms a eutectic compound having a low melting point in conjunction with Fe in the matrix, and the resulting compound is heated and molten by subsequent welding passes to cause the cracking; and a fixing force of grain boundaries in the bead is weakened due to the segregation of S at the grain boundaries and this portion is cracked by a thermal stress from subsequent passes.

The inventors confirmed that fixing C as carbide is effective to jointly preventing the two kinds of cracking. If C is crystallized as a stable carbide at a high temperature when the weld metal solidifies, the eutectic compound having a low melting point due to Si and C is not formed during the solidification and thereby the phenomenon concerning the lengthy remanence of the liquid phase may be eliminated. The crystallization of carbide at high temperature also contributes effectively to the creation of the complexified configuration of the columnar crystal grain boundaries during the solidification and to disperse the thermal stress yielded therein so as to reduce stress concentration. Accordingly the cracking can be prevented even if some liquid phase exists in the columnar crystal grain boundaries. The solidification cracking is supposedly prevented by this combined action.

When C in the weld metal exists as a stable carbide, Si, segregated at the columnar crystal grain boundaries, does not create the eutectic compound having a low melting point in conjunction with C and Fe even if a previous bead is reheated by a thermal cycle in multi-layer welding. Further, the crystallization of carbide contributes to the creation of the complexified configuration of the columnar crystal grain boundaries so that the area of the boundary increases. Thus, the amount of the segregation of S is reduced and thereby the deterioration in the fixing force of grain boundaries is limited. Therefore, the cracking due to the concentration of S does not arise. Consequently, the reheat cracking can also be prevented.

Nb and Zr are the most effective elements to form the above-mentioned carbide. Either one of these elements may be effectively applied, or both of them may otherwise be applied together. A suitable content of Nb and/or Zr in the weld metal is required to satisfy the following formulas ① and ②;

$$Si \leq 0.1(Nb+Zr)+0.05\% \quad ①$$

$$S \leq 0.0015(Nb+Zr)+0.0055\% \quad ②$$

(2) Cold Toughness of Weld Metal

As described above, creating the carbide is effective to prevent cracking in welding. However, an excessive amount of the carbide leads to a deteriorated cold toughness. Thus, in order to satisfy a practically sufficient impact value in equipment used under a low temperature, the amount of the carbide in the weld metal is required to be defined up to a predetermined limit.

(3) Improvement of Stress Corrosion Cracking Resistance of Weld Metal

It has been revealed that the stress corrosion cracking of the Fe—Ni low thermal expansion coefficient alloy is initially caused by corrosion arising in the grain boundaries having the segregated S. This grain boundary corrosion tends to arise in the coarse columnar crystal grain boundaries of the weld metal that has larger solidification segregation than the mother metal. This corrosion is also effectively prevented by crystallization of carbide in the columnar crystal grain boundaries during the solidification which complexifies the configuration of the columnar crystal grain boundaries so as to reduce the amount of the segregated S in the grain boundaries.

A surface treatment is also effective to prevent stress corrosion cracking. Applying the surface treatment, such as shot peening, sand blasting et al., allows compressive stress to remain on the surface of the weld metal, so that the stress corrosion cracking resistance can be enhanced. A coating may be applied to isolate the weld metal from a corrosive environment. For example, the welded metal surface formed by circulating welding may be coated with a suitable organic substance, such as a combination of an epoxy resin cured by an amine and a polyol resin cured by isocyanate, or one component type epoxy resin cured by ketimine, so as to prevent from stress corrosion cracking.

As described above, the effect of preventing the cracking in the weld metal and improving the stress corrosion cracking resistance of the weld metal can be obtained by providing C in the weld metal as the carbide. This utilization of the carbide is the most important means to solve various problems involved in the welding of the Fe—Ni low thermal expansion coefficient alloy. This carbide is required to exist in the columnar crystal grain boundaries of the solid weld metal. Preferably, the amount of the carbide is 0.5 volume % or more of the weld metal, however, since its exceeding existence leads to a deterioration of cold toughness, the amount of the carbide should be limited to 50 volume % or less.

The element needed to form the carbide can be any element, such as Cr, Mo, Ti, Ta, Hf, Nd et al., which forms stable carbide at high temperature. Preferably, at least the carbide of Nb and/or Zr, i.e., (Nb, Zr) C is included. Further, the content of Nb and/or Zr in the carbide is preferable to be 20 weight % or more of the carbide because the carbide can be stable and have a higher melting point in this case.

(4) Workability of Welding Material

As described above, adding Nb and/or Zr is effective in order to improve the properties of the weld metal. However, Nb and Zr tend to create large size oxides because these elements have a strong affinity with oxygen. These oxides dissolve S in the weld metal and contribute to the prevention of the reheat cracking. On the other hand, these oxides increase the deformation resistance during the production of the welding material so that workability is significantly deteriorated.

The inventors have found out that providing Nb and/or Zr as carbide, i.e. (Nb, Zr) C, in the welding material could prevent the creation of the large size oxides so that the workability of the welding material can be improved. The required amount of C in the welding material for creating said carbide increases according to the increase of the amount of Nb and/or Zr. Thus, the contents of C and Nb and/or Zr are required to satisfy the following formula ③;

$$C \geq 0.015(Nb+Zr)+0.04\% \qquad ③$$

(5) Improvement of Weldability in Fabrication

It has been revealed that weldability in fabrication is bound up with the contents of Si, Mn, S, O and Al, as the fact described below.

(A) The arrangement of the ratio of respective contents of Si and Mn, i.e., Si/Mn, in the range of 0.1 to 2.0 prevents burn though or drop-down arising during the most difficult welding operation, i.e., the welding in overhead position, and makes it possible to obtain a flat weld melt. Thus, the contents of Si and Mn are required to satisfy the following formula ④;

$$0.1 \leq (Si/Mn) \leq 2 \qquad ④$$

(B) The uniformity of a welded bead is bound up with the contents of S and O (oxygen) in the welding material, and the total content of S and O should be 0.015% or less in order to obtain uniform beads of straightness. Thus, the contents of S and O are required to satisfy the following formula ⑤;

$$S+O \leq 0.015\% \qquad ⑤$$

(C) When the total content of Al and O (oxygen) is greater than 0.015%, a large amount of slag arises, and this makes the heat input from the arc to the base material insufficient, resulting in the lack of penetration in the root pass of the TIG multi-layer welding. Further, a keyhole cannot be sufficiently formed during the plasma welding operation. Thus, the contents of Al and O are required to satisfy the following formula ⑥

$$Al+O<0.015\% \qquad ①$$

BEST MODE FOR CARRYING OUT THE INVENTION

I. Welded Structure and Welded Pipe of the Present Invention

The welded structure of the present invention is characterized in that its weld metal has the aforementioned chemical composition and satisfies the aforementioned formulas ① and ②. The reasons for defining the respective contents of alloy components are described as follows.

Ni: 30 to 45%

Ni is the primary element which forms a low thermal expansion coefficient alloy. In order to obtain a sufficiently low linear expansion coefficient in the weld metal, Ni is required to be 30 to 45%. A preferable lower limit is 32%, and a more preferable lower limit is 34%. A preferable upper limit is 43%.

Co: 0 to 10%

Co may be added as needed because Co is an element acting to the lower thermal expansion coefficient and stabilize the austenite as with Ni. However, more than 10% of the content of Co leads to a deteriorated toughness of the weld metal and to a necessity of using a higher price welding material to obtain such a weld metal. Thus, when applying Co, its content should be limited to 10% or less, preferably to 8% or less, and more preferably to 6% or less.

C: 0.03 to 0.5%

C is an element stabilizing the austenite matrix. In the weld metal, C reacts with the segregated Si in grain boundaries and Fe in the matrix so as to create the low melting point compound, and thereby to provide an increased cracking sensitivity. Thus, its content should be limited to 0.5% or less, more preferably to 0.4% or less. However, as described above, C also acts to create the carbide in the weld metal so as to complexity the columnar crystal grain boundaries, and thereby to provide an improved stress corrosion cracking resistance of the weld metal. For obtaining this desirable effect, C is required to be contained 0.03% or more.

Si: 0.1 (Nb+Zr)+0.05% or Less (The Range of the Aforementioned Formula ①)

Si is added as a deoxidizing agent. However, Si segregates in the grain boundaries during the solidification of the weld metal, then reacts with C and Fe in the matrix to create the low melting point compound, and consequently causes reheat cracking in multi-layer welding. While Nb and Zr reduce the reheat cracking sensitivity by fixing C, the content of Si should be limited to 0.1 (Nb+Zr)+0.05% or less to assure a sufficient resistance to reheat cracking. However, the lower limit may be set at about 0.005% because excessive reduction of Si leads to an increased manufacturing cost.

Mn: 0.7% or Less

Mn is added as a deoxidizing element during the alloy making as with Si. However, since excessive amounts of Mn leads to a deteriorated toughness and corrosion resistance, its content is set in 0.7% or less, and preferably in 0.6% or less in order to obtain a more excellent impact characteristic. While its lower limit has no particular restriction, the practical lower limit is about 0.005% because excessive Mn reduction increases manufacturing cost as with Si.

Nb, Zr: 0.05 to 4% in either one or in total

These elements act to form carbide in combination with C in the weld metal, and thereby prevent the solidification cracking and reheat cracking of the weld metal and also provide an improved toughness and stress corrosion cracking resistance. In order to obtain this effect, either one of or the total of Nb and Zr is required to be included at 0.05% or more. However, more than 4% of Nb and/or Zr causes an increased free Nb and/or Zr in the grain boundaries and a lowered strength of the grain boundaries. In parallel, oxide of Nb and Zr is formed and this leads to a deteriorated toughness of the weld metal. For obtaining more excellent cold toughness, it should preferably be limited to not more than 3.8%, more preferably to not more than 3.5%.

For preventing the reheat cracking, it is required to satisfy the relationship to Si defined by the aforementioned formula ① and the relationship to S defined by the aforementioned formula ①.

P: 0.02% or Less

P is an inevitable impurity and is required to be 0.02% or less because P increases the solidification cracking sensitivity in welding operations. It is preferable to be 0.015% or less, more preferably 0.010% or less. While excessive reduction of P leads to an increased manufacturing cost, its reduction is enforceable to the extent of 0.0005%.

S: 0.0015 (% Nb+% Zr)+0.0055% or less (the range of the aforementioned formula ①)

As with P, S is an inevitable impurity, which forms a compound having a low melting point during the solidification in the welding operations and thereby arises the solidification cracking. S segregates in the grain boundaries to lower the fixing force of the grain boundaries and thereby increases the reheat cracking sensitivity in multi-layer welding. Further, the grain boundary having the segregated S serves as a starting point of stress corrosion cracking, particularly in the environment containing Cl⁻ion. In order to prevent these harmful effects, it is useful to create the carbide in the columnar crystal grain boundaries and thereby to reduce the segregated amount of S in the grain boundaries. Nb and/or Zr is a suitable element to form this carbide, and the respective contents of these elements and S should be controlled by the formula ②.

Oxygen (O): 0.01% or Less

Oxygen is also an inevitable impurity of the weld metal. When its content exceeds 0.01%, the weld metal is embrittled due to significantly deteriorated cleanliness. Thus, it should be limited to 0.01% or less, preferably to 0.008% or less. While it is desirable to limit oxygen as low as possible, its extreme reduction leads to an increased manufacturing cost. Practically, the lower limit would be about 0.0002%.

Al: 0.01% or Less

Al is a strong deoxidizing element. However, an excessive addition increases the amount of inclusion and lowers the toughness of the weld metal. Thus, the content of Al is set at 0.01% or less, preferably at 0.008% or less. While the content of Al may be substantially zero, the lower limit should be about 0.0002% in view of the effect as deoxidizing agent and the manufacturing cost.

Rare Earth Element: 0 to 0.5%

Rare earth element, represented by Y and La, acts to fix S and may be added as needed because of its effect to prevent reheat cracking. However, its content should be limited to 0.5% or less, preferably to 0.4% or less because its excessive addition leads to a deteriorated cleanliness and a lowered workability and toughness of the weld metal. When the rare earth element is added in expectation of the above effect, 0.001% or more may be desirably selected.

Other than the alloy elements and impurities described above, the remainder of the weld metal can substantially be Fe, or one or more auxiliary components, which are included in the base material of a Fe—Ni low thermal expansion coefficient alloy, such as Ti, Ta, Cr, Mo, Hf, Nd et al., can be additionally included in about 0.5% or less respectively. These components create the carbide in the weld metal and thereby contribute to the prevention of cracking and the improvement of stress corrosion cracking resistance.

In the welded structure of the present invention, both members to be joined to each other by welding may be made of a Fe—Ni low thermal expansion coefficient alloy, or either one of the members may be made of a different alloy such as stainless steel. A stainless steel component, such as joints, valves, or the like, is occasionally installed in the pipeline. In this case, so-called dissimilar metal welding, wherein the component is welded to the pipe made of a Fe—Ni low thermal expansion coefficient alloy, is carried out. This welding may be adequately carried out when the weld metal satisfies the aforementioned conditions. Specifically, when the dissimilar welding is carried out with stainless steel, a dilution ratio is preferably limited to 50% or less. More than 50% of dilution ratio leads to an increased content of Cr in the carbide within the weld metal due to the diffusion of Cr from the stainless steel, resulting in a lowered melting point of the carbide which could possibly induce reheat cracking.

Any existing Fe—Ni low thermal expansion coefficient alloy may be applied as a base material of the structure or welded pipe. In particular, for the base material of the structure in which welding is carried out with a relatively high dilution ratio, it is desirable to apply an alloy having the following composition.

A Fe-base alloy comprises Ni: 30 to 45%, Co: 0 to 10% or less, Mn: 1.0% or less, Si: 1.0% or less, C: more than 0.2% to 0.5%, Nb: more than 0.5% to 2.0%, and rare earth element: 0 to 0.5%, with impurities being S: 0.01% or less, P: 0.01% or less, Al: 0.01% or less, and O (oxygen): 0.01% or less, wherein the respective contents of S, O and Nb satisfy the following formula;

$$S+O \leq 0.005 \times Nb+0.01(\%) \tag{7}$$

Since this alloy includes a relatively large amount of C and also includes Nb, even if welding is carried out with a relatively high dilution ratio, Nb and C is supplied from the base material to the weld metal so that NbC can be assured in the weld metal. In addition, since the content of Nb is arranged to satisfy the above formula ⑦, oxygen and S are combined with each other to form Nb (S, O). Thus, the grain boundary segregation of S and O (oxygen) in the weld metal is reduced so that the fixing force of the grain boundaries can be prevented from being lowered. By virtue of these actions, this alloy may be sufficiently free from reheat cracking. This alloy is useful particularly as a material for producing the welded pipe.

The weld metal, having the composition defined in the present invention, has practically sufficient characteristics as welded. However, the weld metal may be subjected to an annealing treatment at 300 to 700° C. for relieving residual stress and for reducing stress corrosion cracking sensitivity. The heating time may be set in the range of "t/20" hour to "t/5" hour, where t (mm) is the thickness of the member to be welded (base material). When the heating temperature is lower than 300° C. or the heating time is shorter than "t/20" hour, the effect of relieving the residual stress cannot be obtained. Heating at temperature of higher than 700° C. causes the redistribution of S to arise and thereby reheat cracking an stress corrosion cracking sensitivities are reversely increased. Heating longer than "t/5" hour leads to a creation of excessive carbide formation in grain boundaries and a lowered cold toughness.

A structure having the aforementioned weld metal of the present invention can be obtained by using a welding material having a particular chemical composition determined in consideration of dilution ratio, depending on welding conditions. For the welding material, it is desirable to apply the following material of the present invention.

II. Welding Material

Respective contents of the components forming the welding material of the present invention have been determined for the following reasons.

Ni: 30 to 45%

As described above, Ni is a primary element forming a low thermal expansion coefficient alloy, and Ni in the welding material moves into the weld metal. Thus, the reason for the definition of its content is the same as in the aforementioned weld metal.

Co: 0 to 10%

In the welding material, Co is a component which may be added as needed. Similar to Ni, Co in the welding material also moves into the weld metal. Thus, the reason for the definition of its content is the same as in the aforementioned weld metal.

C: 0.5% or Less, and (Zr+Nb)+0.04% or more (the range of the formula ③)

As described above, C acts to stabilize the austenite in the weld metal, but increases reheat cracking sensitivity. However, when C is fixed as a carbide of Nb and/or Zr, as described above, the reheat cracking sensitivity can be lowered and this carbide contributes to the prevention of cracking and also to the improvement of the stress corrosion cracking resistance of the weld metal. For assuring this desirable effect, the welding material is required to include (Zr+Nb)+0.04% or more of C. On the other hand, excessive C leads to the aforementioned harmful effect to the weld metal and to a damaged workablility (hot and cold workability) of the welding material. Thus, in the welding material, the upper limit should be 0.5%.

Si: 0.1 (Nb+Zr)+0.05% or Less (the range of the aforementioned formula ①)

First, the content of Si should be in the range of the above formula ① for the same reason as in the weld metal. Further, Si affects the properties of the weld metal and dominates weldability in fabrication. This affect has relation to the content of Mn. Thus, the welding material is required to satisfy the following formula ④.

Mn: 0.7% or Less and in The Range of $0.1 \leq (Si/Mn) \leq 2.0$ (The Formula ④)

The reason for determining the upper limit (0.7%) is the same as in the weld metal. Further, in the welding material, "Si/Mn" affects the weldability in fabrication. When this ratio is smaller than 0.1, the composition of slag created on the surface of molten pool becomes Mn-rich and the weld metal tends to be a convex bead, resulting in lack of fusion. On the other hand, when this ratio exceeds 2.0, the viscosity of the weld metal lowers and thereby the drop-down of the weld metal arises during the overhead welding. Thus, Mn in the welding material is required to satisfy the above formula ④.

Nb, Zr: 0.2 to 4% in either one or in total

As described above, 0.05% or more of Nb and/or Zr is required to be included in the weld metal. In order to assure this content, the lower limit in the welding material should be 0.2% in consideration of the dilution by the base material during welding. The upper limit should be 4% for the same reason as in the weld metal. In view of manufacturing performance, it is also required to satisfy the aforementioned relationship with the content of C (the formula ③). Further, in order to prevent cracking, it is desirable to apply a welding material having 1.2 to 4% of Nb and/or Zr to the first and second layers which suffer a relatively high dilution caused by the base material. In the succeeding welding operation, it is required to apply a welding material having 0.2 to 1.2% of Nb and/or Zr in view of assuring toughness.

P: 0.02% or Less

P, which is an inevitable impurity in the welding material, moves into the weld metal and increases solidification cracking sensitivity. Thus, as in the weld metal, it is limited to 0.02% or less, preferably to 0.015% or less, and more preferably to 0.010% or less.

S: 0.0015 (Nb+Zr)+0.0055% or less (the range of the aforementioned formula ②), and S+O (oxygen)$\leq$0.015% (the range of the aforementioned formula ⑤).

As described above, the content of S is required to satisfy the formula ② in order to prevent the reheat cracking of the weld metal. On the other hand, S is an element which strongly affects weldability in fabrication. Thus, in order to assure an excellent weldability in fabrication, particularly a capability of achieving the uniformity of a weld bead and complete formation of root pass bead, it is required to satisfy the formula ⑤ in relation to the contents of oxygen (O).

Oxygen (O): 0.01% or Less, and in the range satisfying the aforementioned formulas ⑤ and ⑥

The reason for limiting the content of oxygen to 0.01% or less is the same as that described above. In the welding material, more than 0.01% of oxygen causes a breaking of wire in a drawing process due to a deteriorated cleanliness. Further, an interaction with other elements, particularly with S and Al, it strongly affects the weldability in fabrication. Thus, it is also required to satisfy the formulas ⑤ and ⑥.

Al: 0.01% or Less and Al+O (oxygen)$\leq$0.015% (the range of the aforementioned formula ⑥)

The reason for the upper limit (0.01%) is the same as in the weld metal. Al tends to form slag in combination with oxygen, and consequently resists the heat input from the arc to the base metal, resulting in lack of penetration in root pass. For preventing this, it is required to satisfy the formula ⑥. As with the weld metal, the content of Al can be substantially zero.

In the components forming the welding material of the present invention, the remainder, other than the alloy elements described above, may be substantially Fe. Additionally auxiliary component(s) such as about 0.5% or less respectively of Ti, Ta, Cr, Mo, Hf, Nd et al., which may be included in the weld metal may also be included.

Any welding process may be optionally selected to produce the welded structure of the present invention. Even if any welding process is applied, when a formed weld metal has the chemical composition within the aforementioned range and satisfies the formulas ① and ②, no cracking arises and an excellent cold toughness may be achieved.

Preferably, the welding material of the present invention is used in TIG or the plasma welding process. Because, in these welding processes, the wastage of alloy elements in the welding material is low and the welded material of low oxygen content can be obtained so that further improved cold toughness may be effectively achieved.

As described above, according to the welding material of the present invention, a fine weld metal may be obtained through all position welding. Thus, with this material, the circulating welding for jointing pipes may also be automated. Further, a pipe (welded pipe) may readily be manufactured by welding a formed plate of a Fe—Ni low thermal expansion coefficient alloy through the seam welding process with this material. This pipe has a welded zone which has excellent characteristics and can be suitably applied as a pipeline of cryogenic substances, such as LNG et al.

EXAMPLE

Example 1

Thirty kinds of welding wires (diameter: 1.2 mm) having respective chemical compositions shown in Tables 1 and 2 were manufactured and various tests were carried out. In the trial manufacture, since respective contents of C in B5, B11, and B15 were far below the lower limit, (Zr+Nb)+0.04%, in the aforementioned formula ③ welding materials could not be manufactured from them due to their breakage in the wire manufacturing process.

Figure 1:
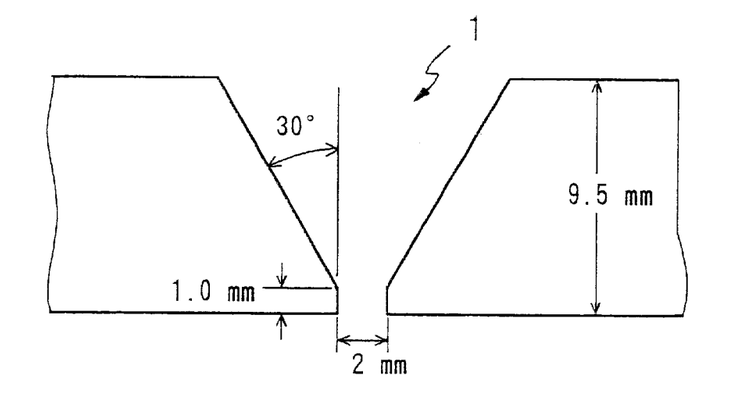
FIG. 1 is a sectional view showing a groove shape for TIG welding, employed in the example.
Figure 2:
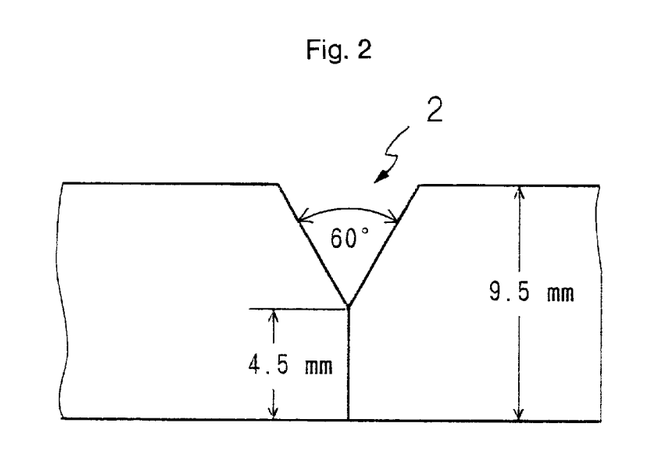
FIG. 2 is a sectional view showing a groove shape for plasma welding, employed in the example.
Figure 3:
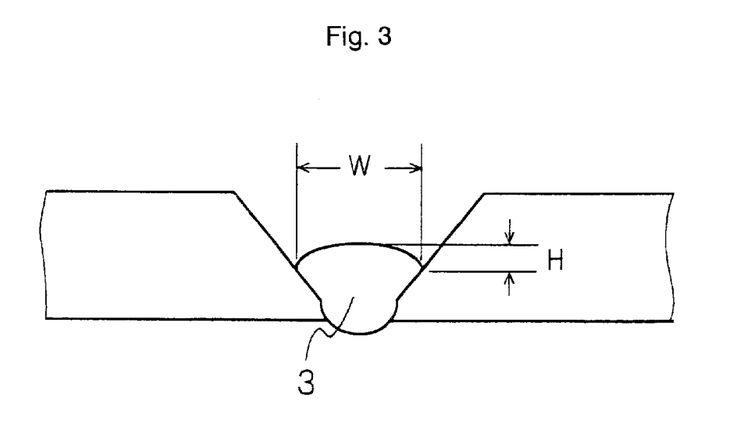
FIG. 3 is a sectional view showing a method to measure the flatness of a welded bead.

Two kinds of alloy plates (base material), having 9.5 mm of thickness and respective chemical compositions shown in Table 3, were processed in the grooves shown in FIGS. 1 and 2, and then welding operations were carried out by the respective TIG and the plasma welding processes.

The TIG welding was carried out in a respective flat position and overhead position. Then, the root pass bead forming capability of a welding bead in the first layer, the uniformity of welding bead, and the flatness of welding bead were evaluated. The plasma welding operation was carried out in downward position. Then, the root pass bead forming capability and the uniformity of welding bead were evaluated. In the evaluation of the root pass bead forming capability, when a root pass bead was formed all over the weld line (root pass bead formation ratio: 100%), it was evaluated as acceptable. In the evaluation of the uniformity of welding bead, the width of the welding bead was measured at even intervals, and the difference between maximum and minimal widths ($\Delta W$) and the average value ($W_{ave}$) were determined. Then, when their ratio ($\Delta W/W_{ave}$) did not exceed 0.2, it was evaluated as acceptable.

In the evaluation of the flatness of welding bead, the height (H) of reinforcement of weld and the width (W) of the welding bead were measured. Then, when their ratio (H/W) did not exceed 0.5, it was evaluated as acceptable. These results are shown in Tables 4 and 5. In the column of "Welding Process" in Tables 4, 5, 6, and 8, TIG means the TIG welding process and PAW means the plasma arc welding process.

As is apparent from Table 4, when the welding materials of A1 to A15, B1 to B4, and B6, which satisfy all of the main characteristics, i.e., relationships between oxygen, Al and S (the aforementioned formulas ⑥ and ⑤ ) and the relationship between Mn and Si (the aforementioned formulas ④ ), are applied (AW1 to AW19, BW1 to BW4 and BW5), it is proved that an excellent weldability in fabrication is provided regardless of the welding processes and the welding positions.

Conversely, as shown in Table 5, when the welding materials of the comparative examples ( B7 to B10 and B12 to B14), which do not satisfy more than either one of the aforementioned formulas ④ to ⑥, are applied, all of the formation capability of root pass bead, the uniformity of welding bead, and the flatness of welding bead could not be satisfied.

TABLE 1

Welding Material (weight %, Fe: bal.)

| Mark | C | Si | Mn | P | S | Ni | Nb | Zr | Al | O | Other | ☆1 | ☆2 | ☆3 | Si + Mn | S + O | Al + O |
|---|---|---|---|---|---|---|---|---|---|---|---|---|---|---|---|---|---|
| Examples of This Invention | | | | | | | | | | | | | | | | | |
| A1 | 0.18 | 0.19 | 0.70 | 0.006 | 0.005 | 35.8 | 1.45 | — | 0.003 | 0.005 | | 0.195 | 0.0077 | 0.062 | 0.27 | 0.010 | 0.008 |
| A2 | 0.50 | 0.09 | 0.10 | 0.015 | 0.002 | 30.2 | 0.80 | — | 0.008 | 0.005 | Ce: 0.003 | 0.130 | 0.0067 | 0.052 | 0.90 | 0.007 | 0.013 |
| A3 | 0.25 | 0.10 | 0.23 | 0.011 | 0.006 | 32.0 | — | 0.51 | 0.004 | 0.006 | | 0.101 | 0.0063 | 0.048 | 0.43 | 0.012 | 0.010 |
| A4 | 0.30 | 0.20 | 0.44 | 0.005 | 0.004 | 38.2 | — | 1.96 | 0.010 | 0.003 | | 0.246 | 0.0084 | 0.069 | 0.45 | 0.007 | 0.013 |
| A5 | 0.26 | 0.15 | 0.32 | 0.009 | 0.008 | 34.0 | 1.41 | 1.60 | 0.007 | 0.007 | | 0.351 | 0.0100 | 0.085 | 0.47 | 0.015 | 0.015 |
| A6 | 0.05 | 0.10 | 0.10 | 0.001 | 0.001 | 42.0 | 0.42 | 0.15 | 0.005 | 0.010 | La: 0.1 | 0.107 | 0.0064 | 0.049 | 1.00 | 0.011 | 0.015 |
| A7 | 0.09 | 0.05 | 0.12 | 0.0005 | 0.002 | 39.8 | 0.06 | 0.16 | 0.003 | 0.010 | | 0.071 | 0.0058 | 0.043 | 0.42 | 0.012 | 0.013 |
| A8 | 0.17 | 0.16 | 0.08 | 0.006 | 0.003 | 43.0 | 0.81 | 1.22 | 0.004 | 0.009 | Co: 1.25 | 0.252 | 0.0085 | 0.070 | 2.00 | 0.012 | 0.013 |
| A9 | 0.10 | 0.41 | 0.50 | 0.015 | 0.005 | 36.5 | 2.05 | 1.89 | 0.003 | 0.002 | | 0.444 | 0.0114 | 0.099 | 0.82 | 0.007 | 0.005 |
| A10 | 0.45 | 0.01 | 0.10 | 0.006 | 0.002 | 32.1 | 3.95 | — | 0.003 | 0.008 | Y: 0.001 La: 0.002 | 0.445 | 0.0114 | 0.099 | 0.10 | 0.010 | 0.011 |
| A11 | 0.07 | 0.20 | 0.18 | 0.018 | 0.003 | 34.6 | 0.96 | 1.02 | 0.004 | 0.005 | | 0.248 | 0.0085 | 0.070 | 1.11 | 0.008 | 0.009 |
| A12 | 0.07 | 0.11 | 0.62 | 0.010 | 0.008 | 44.8 | 1.35 | 0.55 | 0.002 | 0.006 | | 0.240 | 0.0084 | 0.069 | 0.18 | 0.014 | 0.008 |
| A13 | 0.15 | 0.04 | 0.40 | 0.020 | 0.001 | 31.3 | 0.12 | 0.10 | 0.004 | 0.008 | | 0.072 | 0.0058 | 0.043 | 0.10 | 0.009 | 0.012 |
| A14 | 0.20 | 0.21 | 0.16 | 0.004 | 0.003 | 36.9 | 3.01 | 0.12 | 0.005 | 0.010 | | 0.363 | 0.0102 | 0.087 | 1.31 | 0.013 | 0.015 |
| A15 | 0.22 | 0.04 | 0.09 | 0.002 | 0.003 | 35.5 | — | 0.20 | 0.005 | 0.002 | | 0.070 | 0.0058 | 0.043 | 0.44 | 0.005 | 0.007 |

Note)
☆1: 0.1(Nb + Zr) + 0.05
☆2: 0.0015(Nb + Zr) + 0.0055
☆3: 0.015(Zr + Nb) + 0.04

TABLE 2

Welding Material (weight %, Fe: bal.)

| Mark | C | Si | Mn | P | S | Ni | Nb | Zr | Al | O | Other | ☆1 | ☆2 | ☆3 | Si + Mn | S + O | Al + O |
|---|---|---|---|---|---|---|---|---|---|---|---|---|---|---|---|---|---|
| Comparative Examples | | | | | | | | | | | | | | | | | |
| B1 | 0.18 | 0.12* | 0.57 | 0.003 | 0.004 | 36.9 | 0.40 | — | 0.003 | 0.004 | | 0.090* | 0.0061 | 0.046 | 0.21 | 0.008 | 0.007 |
| B2 | 0.24 | 0.24* | 0.48 | 0.015 | 0.006 | 40.2 | 0.98 | 0.72 | 0.002 | 0.003 | | 0.220* | 0.0081 | 0.066 | 0.50 | 0.009 | 0.005 |
| B3 | 0.07 | 0.13 | 0.07 | 0.008 | 0.009* | 44.6 | 0.51 | 0.49 | 0.001 | 0.002 | Co: 1.46 | 0.150 | 0.0070* | 0.055 | 1.86 | 0.011 | 0.003 |
| B4 | 0.20 | 0.22 | 0.18 | 0.005 | 0.010* | 30.9 | 1.48 | 0.50 | 0.003 | 0.003 | | 0.248 | 0.0085* | 0.070 | 1.22 | 0.013 | 0.006 |
| B5 | 0.03* | 0.10 | 0.24 | 0.006 | 0.003 | 36.0 | 0.79 | 0.83 | 0.002 | 0.002 | | 0.212 | 0.0079 | 0.064* | 0.42 | 0.005 | 0.004 |
| B6 | 0.16 | 0.09 | 0.25 | 0.016 | 0.001 | 41.3 | — | 4.09* | 0.003 | 0.005 | La: 0.5 | 0.459 | 0.0116 | 0.101 | 0.36 | 0.006 | 0.008 |

TABLE 2-continued

Welding Material (weight %, Fe: bal.)

| Mark | C | Si | Mn | P | S | Ni | Nb | Zr | Al | O | Other | ☆1 | ☆2 | ☆3 | Si + Mn | S + O | Al + O |
|---|---|---|---|---|---|---|---|---|---|---|---|---|---|---|---|---|---|
| B7 | 0.09 | 0.03* | 0.51* | 0.020 | 0.0005 | 42.1 | 0.81 | 1.62 | 0.008* | 0.009* | Co: 0.293 | 0.0091 | 0.076 | 0.06* | 0.0095 | 0.017* |
| B8 | 0.40 | 0.14* | 0.06* | 0.003 | 0.007* | 31.9 | 0.18 | 0.11 | 0.007* | 0.009* | 7.97 | 0.079* | 0.0059* | 0.044 | 2.33* | 0.016* | 0.016* |
| B9 | 0.26 | 0.24* | 0.10* | 0.004 | 0.003 | 41.8 | — | 1.41 | 0.003 | 0.004 | | 0.194* | 0.0076 | 0.061 | 2.40* | 0.007 | 0.007 |
| B10 | 0.49 | 0.19* | 0.73* | 0.010 | 0.002 | 34.6 | 0.51 | 0.55 | 0.004 | 0.006 | | 0.156* | 0.0071 | 0.056 | 0.26 | 0.008 | 0.010 |
| B11 | 0.08* | 0.40 | 0.51 | 0.006 | 0.005 | 30.5 | 1.96 | 1.93 | 0.003 | 0.002 | Ce: 0.439 | 0.0113 | 0.098* | 0.78 | 0.007 | 0.005 |
| B12 | 0.09 | 0.04 | 0.68* | 0.007 | 0.010* | 40.2 | 0.10 | 1.65 | 0.004 | 0.007* | 0.11 | 0.225 | 0.0081* | 0.066 | 0.06* | 0.017* | 0.011 |
| B13 | 0.11 | 0.05 | 0.57* | 0.012 | 0.012* | 38.6 | 0.98 | 0.93 | 0.004 | 0.010* | | 0.242 | 0.0084* | 0.069 | 0.09* | 0.022* | 0.015 |
| B14 | 0.21 | 0.17* | 0.32 | 0.008 | 0.001 | 39.6 | 0.99 | — | 0.013* | 0.004* | | 0.149* | 0.0070 | 0.055 | 0.53 | 0.005 | 0.017* |
| B15 | 005* | 0.06 | 0.21 | 0.010 | 0.002 | 36.9 | 1.21 | 1.45 | 0.005 | 0.005 | | 0.316 | 0.0095 | 0.080* | 0.29 | 0.007 | 0.010 |

Note 1)
☆1: 0.1(Nb + Zr) + 0.05
☆2: 0.0015(Nb + Zr) + 0.0055
☆3: 0.015(Zr + Nb) + 0.04

Note 2)
The mark * after each numerical value indicates that the value is out of the range defined in the present invention.

TABLE 3

Tested Alloy Plate (weight %, Fe: bal.)

| Mark | C | Si | Mn | P | S | Ni | Co | Nb | Al | O | REM |
|---|---|---|---|---|---|---|---|---|---|---|---|
| C1 | 0.005 | 0.07 | 0.41 | 0.005 | 0.001 | 36.02 | — | — | 0.003 | 0.004 | — |
| C2 | 0.20 | 0.11 | 0.82 | 0.008 | 0.002 | 32.31 | 3.6 | 0.85 | 0.003 | 0.003 | Ce: 0.002 |

TABLE 4

Evaluation Results of Weldability in Fabrication of Welding Material

| | | | Welding Position | | | | | |
|---|---|---|---|---|---|---|---|---|
| | | | Flat Position | | | Overhead Position | | |
| Mark | Welding Material | Welding Process | Root Pass Bead Forming Capability (Root Pass Bead Formation Ratio(%)) | Uniformity of Welding Bead (ΔW/W$_{ave}$) | Flatness of Welding Bead (H/W) | Root Pass Bead Forming Capability (Root Pass Bead Formation Ratio(%)) | Uniformity of Welding Bead (ΔW/W$_{ave}$) | Flatness of Welding Bead (H/W) |
| Examples of This Invention | | | | | | | | |
| AW1 | A1 | TIG | ○(100) | ○(0.14) | ○(0.44) | ○(100) | ○(0.16) | ○(0.46) |
| AW2 | A1 | PAW | ○(100) | ○(0.17) | | — | | |
| AW3 | A2 | TIG | ○(100) | ○(0.11) | ○(0.16) | ○(100) | ○(0.13) | ○(0.17) |
| AW4 | A3 | TIG | ○(100) | ○(0.15) | ○(0.22) | ○(100) | ○(0.14) | ○(0.24) |
| AW5 | A4 | TIG | ○(100) | ○(0.10) | ○(0.24) | ○(100) | ○(0.11) | ○(0.28) |
| AW6 | A5 | TIG | ○(100) | ○(0.16) | ○(0.21) | ○(100) | ○(0.18) | ○(0.25) |
| AW7 | A5 | PAW | ○(100) | ○(0.18) | | — | | |
| AW8 | A6 | TIG | ○(100) | ○(0.14) | ○(0.12) | ○(100) | ○(0.13) | ○(0.19) |
| AW9 | A7 | TIG | ○(100) | ○(0.13) | ○(0.26) | ○(100) | ○(0.13) | ○(0.25) |
| AW10 | A8 | TIG | ○(100) | ○(0.15) | ○(0.10) | ○(100) | ○(0.16) | ○(0.22) |
| AW11 | A9 | TIG | ○(100) | ○(0.09) | ○(0.26) | ○(100) | ○(0.11) | ○(0.33) |
| AW12 | A10 | TIG | ○(100) | ○(0.14) | ○(0.48) | ○(100) | ○(0.17) | ○(0.48) |
| AW13 | A10 | PAW | ○(100) | ○(0.16) | | — | | |
| AW14 | A11 | TIG | ○(100) | ○(0.12) | ○(0.14) | ○(100) | ○(0.13) | ○(0.17) |
| AW15 | A12 | TIG | ○(100) | ○(0.17) | ○(0.18) | ○(100) | ○(0.16) | ○(0.22) |
| AW16 | A13 | TIG | ○(100) | ○(0.13) | ○(0.46) | ○(100) | ○(0.14) | ○(0.48) |
| AW17 | A14 | TIG | ○(100) | ○(0.17) | ○(0.19) | ○(100) | ○(0.19) | ○(0.23) |
| AW18 | A15 | TIG | ○(100) | ○(0.06) | ○(0.23) | ○(100) | ○(0.07) | ○(0.26) |
| AW19 | A15 | PAW | ○(100) | ○(0.10) | | — | | |

Note)
○: acceptable
X: failure

TABLE 5

Evaluation Results of Weldability in Fabrication of Welding Material

| | | | Welding Position | | | | | |
|---|---|---|---|---|---|---|---|---|
| | | | Flat Position | | | Overhead Position | | |
| Mark | Welding Material | Welding Process | Root Pass Bead Forming Capability (Root Pass Bead Formation Ratio(%)) | Uniformity of Welding Bead ($\Delta W/W_{ave}$) | Flatness of Welding Bead (H/W) | Root Pass Bead Forming Capability (Root Pass Bead Formation Ratio(%)) | Uniformity of Welding Bead ($\Delta W/W_{ave}$) | Flatness of Welding Bead (H/W) |
| Comparative Examples | | | | | | | | |
| BW1 | B1 | TIG | ○(100) | ○(0.12) | ○(0.38) | ○(100) | ○(0.13) | ○(0.40) |
| BW2 | B2 | TIG | ○(100) | ○(0.14) | ○(0.24) | ○(100) | ○(0.16) | ○(0.26) |
| BW3 | B3 | TIG | ○(100) | ○(0.17) | ○(0.12) | ○(100) | ○(0.18) | ○(0.18) |
| BW4 | B4 | TIG | ○(100) | ○(0.16) | ○(0.16) | ○(100) | ○(0.15) | ○(0.24) |
| BW5 | B5 | | Welding Material could not be manufactured. | | | | | |
| BW6 | B6 | TIG | ○(100) | ○(0.10) | ○(0.28) | ○(100) | ○(0.12) | ○(0.31) |
| BW7 | B7 | TIG | X(64)* | ○(0.16) | X(0.57)* | X(55)* | ○(0.18) | X(0.52)* |
| BW8 | B8 | TIG | X(76)* | X(1.26)* | ○(0.10) | X(68)* | X(1.32)* | X(drop-down)* |
| BW9 | B8 | PAW | X(70)* | X(1.44)* | | | | — |
| BW10 | B9 | TIG | ○(100) | ○(0.12) | ○(0.12) | ○(100) | ○(0.15) | X(drop-down)* |
| BW11 | B10 | TIG | ○(100) | ○(0.14) | ○(0.40) | ○(100) | ○(0.16) | ○(0.37) |
| BW12 | B11 | | Welding Material could not be manufactured. | | | | | |
| BW13 | B12 | TIG | ○(100) | X(1.23)* | X(0.63)* | ○(100) | X(1.58)* | X(0.84)* |
| BW14 | B12 | PAW | ○(100) | X(1.40)* | | | | — |
| BW15 | B13 | TIG | ○(100) | X(2.14)* | ○(0.54) | ○(100) | X(2.12)* | X(2.44)* |
| BW16 | B14 | TIG | X(82)* | ○(0.09) | ○(0.29) | X(66)* | ○(0.12) | ○(0.12) |
| BW17 | B15 | | Welding Material could not be manufactured. | | | | | |

Note)
The mark * indicates that intended levels were not attained, (○: acceptable X: failure).

According to the above test results, it is apparent that only the welding materials having the chemical compositions defined in the present invention provide a sufficient weldability in fabrication and are applicable to the all position welding or automatic welding. Further, these welding materials have an excellent manufacturing performance and are capable of stably supplying the welding materials.

Example 2

Figure 4:
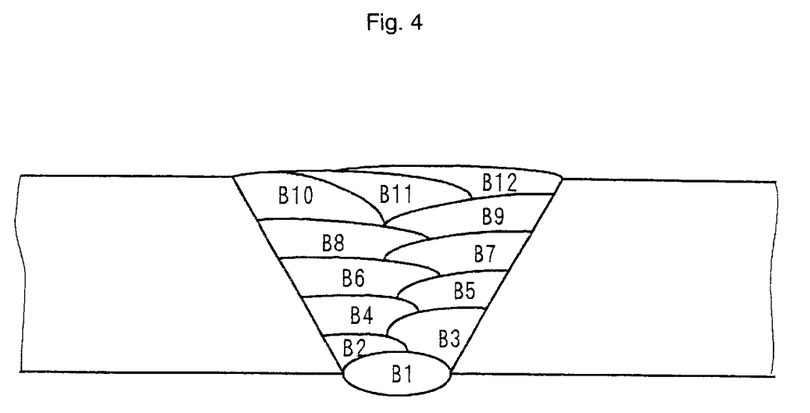
FIG. 4 is a sectional view showing a deposition method for TIG welding, employed in the example.
Figure 5:
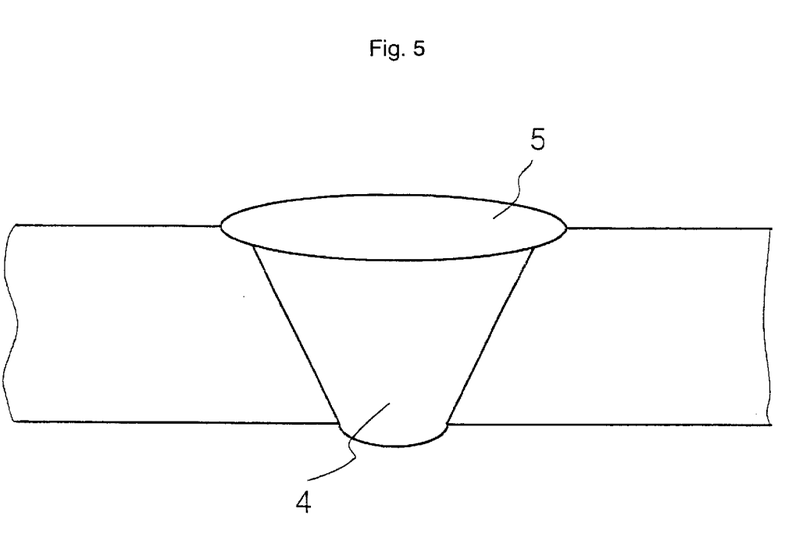
FIG. 5 is a sectional view showing a deposition method for plasma welding, employed in the example.

In order to examine welded joint performance, welded joints were produced by applying the base materials having the joint geometries 1 and 2 shown in FIGS. 1 and 2; using the welding materials shown in Table 1; and in the TIG welding process, welding with 6 multi-layer welding layers having B1 to B12 of 12 paths shown in FIG. 4, and in the plasma welding process, welding with one plasma welding layer shown by the reference number 4 in FIG. 5 and one TIG welding layer shown by the reference number 5 in FIG. 5.

Test specimens for chemical analysis were taken from the weld metals of produced joints to carry out chemical analyses. The ratio of the carbide in the columnar crystal grain boundary of the weld metal was also measured by observing microstructure of the weld metal by using an electron microscope, and the composition of the carbide was analyzed by EDX analysis to determine respective contents of Nb and Zr in the carbide.

Figure 6:
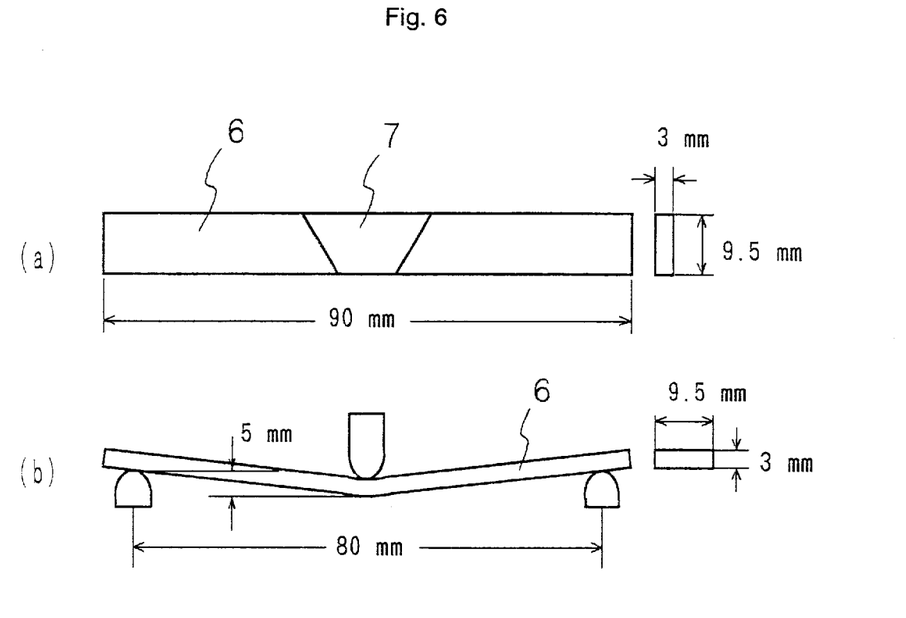
FIGS. 6a and 6b are sectional views showing an evaluation method of reheat cracking, employed in the example.
Figure 7:
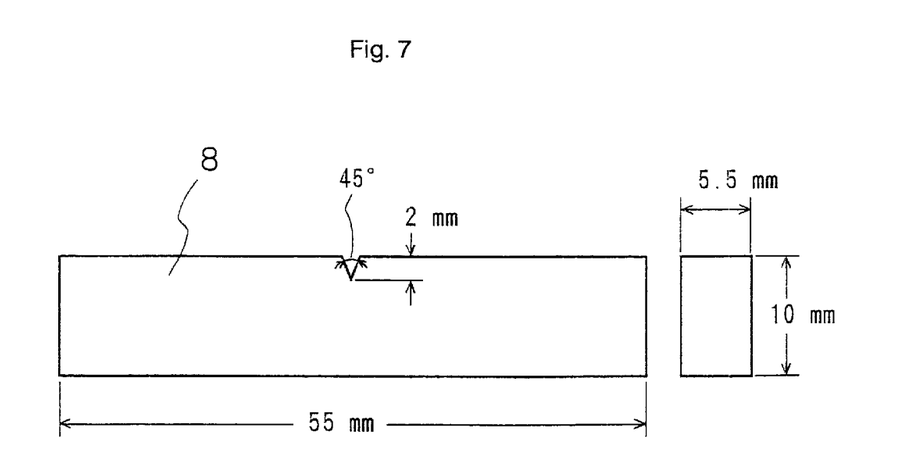
FIG. 7 is a sectional view showing a test specimen for a Charpy impact test, employed in the example.

Further, a test specimen 6 for the bending test shown in FIG. 6 (a) (the reference number 7 indicates the weld metal portion) and a test specimen 8 of the V-notch Charpy impact test (the notch was provided in the weld metal portion) were taken and they were put to a verification test for checking the existence of reheat cracking and an impact test at −196° C.

In the verification test of reheat cracking, in order to facilitate observation, the test specimen was applied with a slight curvature as shown in FIG. 6(b). When there was a microscopic reheat cracking, it was opened. Then, the weld metal portion was observed with 100 to 500 magnifications using an optical microscope to check the occurrence of reheat cracking. In criteria of the verification test, no cracking was evaluated as an acceptable one, and when even one cracking arose in the test specimen, it was evaluated as a failure.

In acceptance/failure judgment of the impact test, an impact value 30 J/cm$^2$, which is practically required for welded joints, was applied as criteria. The impact test was not carried out in those in which cracking arose in the verification test of reheat cracking.

Figure 8:
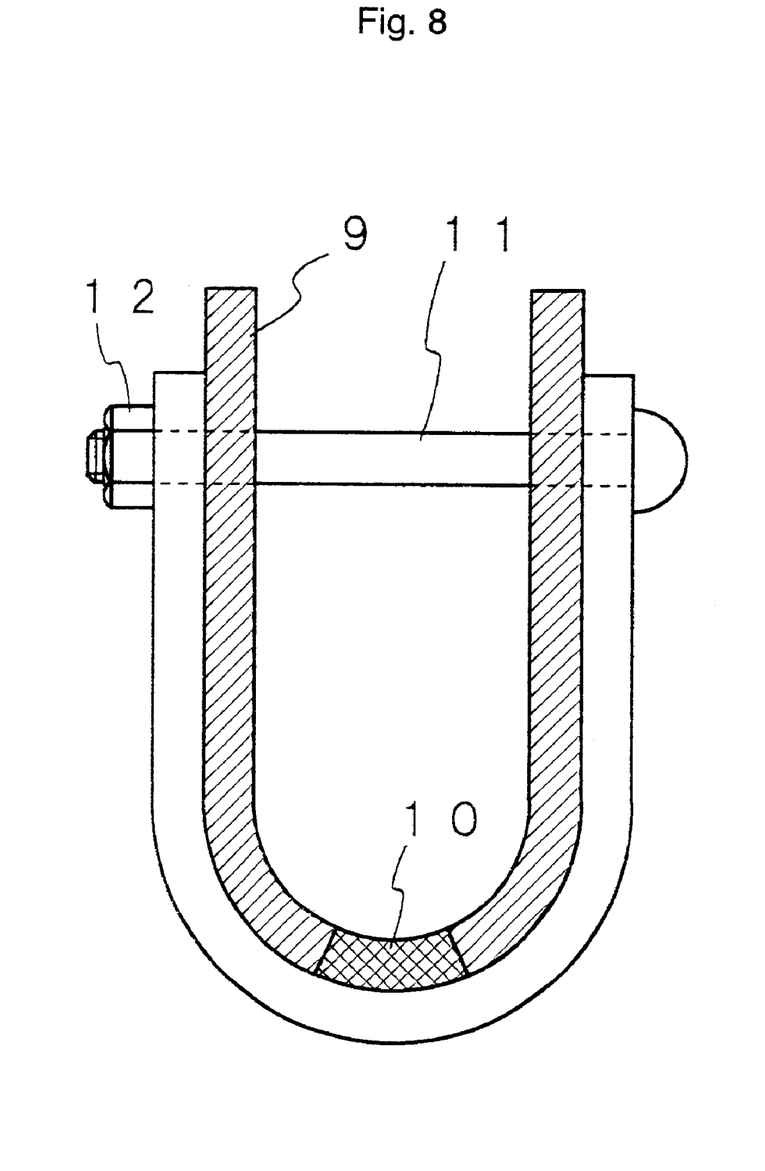
FIG. 8 is a sectional view showing a test specimen for a stress corrosion cracking test, employed in the example.

Further, a double U-bent test specimen 9 as shown in FIG. 8 was taken from the welded joint. After an immersion test using Na Cl water solution with 500 ppm of Cl$^{31}$ density for 100 hours at 40° C. in the air, stress corrosion cracking resistance was evaluated by observing a sectional microstructure in the parallel direction to tensile stress, using an optical microscope of 50 magnifications to check the occurrence of cracking. The size of the test specimen 9 was 10 mm×75 mm×2 mm. For putting to the test, the test specimen was kept under restraint in the U-shape by a bolt 11 and a nut 12, with setting the weld metal 10 on the center.

The results of the analysis are shown in Tables 6 and 8, and the results of the evaluation of joint properties are shown in Tables 7 and 9.

As is apparent in tables 6 and 7, AWJ1 to AWJ20 having the chemical composition of the weld metal in the range defined in the present invention, do not raise any reheat cracking in the weld metal and have a practically sufficient impact characteristic of not lower than 30 J/cm$^2$ under −196° C. of very low temperature. AWJ20 is an example in which C2 in table 3, including Nb is applied as its base material. In this case, compared with an example (AWJ3) in which C1 including no Nb is applied as its base material, applicable range of the formulas 1 and 2 are broadened out. This proves that the base material of C2, including Nb, is suitable for the welding having high dilution ratio.

On the other hand, as shown in Tables 8 and 9, the welded joints (BWJ1 to BWJ12) having the chemical composition of the weld metal out of the range defined in the present invention raise reheat cracking and their impact values do not measure up to 30 J/cm². Under the environment containing chloride, an occurrence of stress corrosion cracking was verified, and the reheat cracking resistance, toughness and stress corrosion cracking resistance could not be satisfied together.

According to the above test results, it is apparent that only the welding materials having the chemical compositions defined in the present invention provide a weld metal capable of raising no cracking and achieving an excellent toughness and stress corrosion cracking resistance.

TABLE 7-continued

Evaluation Results of Welded Joint Properties

| Mark | Carbide Rate(%) | Nb + Zr Content in Carbide(%) | Evaluation Results of Reheat Cracking | Impact Values at −196° C. (J/cm²) | Results of U-bend Test |
|---|---|---|---|---|---|
| AWJ3 | 9.1 | 71.1 | ○ | 84 | ○ |
| AWJ4 | 1.3 | 72.3 | ○ | 88 | ○ |
| AWJ5 | 26.5 | 66.3 | ○ | 58 | ○ |
| AWJ6 | 43.0 | 70.2 | ○ | 63 | ○ |
| AWJ7 | 13.0 | 73.1 | ○ | 70 | ○ |
| AWJ8 | 1.6 | 71.1 | ○ | 110 | ○ |
| AWJ9 | 16.3 | 67.6 | ○ | 55 | ○ |
| AWJ10 | 32.6 | 65.1 | ○ | 40 | ○ |
| AWJ11 | 30.3 | 70.1 | ○ | 43 | ○ |
| AWJ12 | 16.6 | 66.6 | ○ | 55 | ○ |

TABLE 6

Results of Weld Metal Analysis

| Mark | Base Metal | Welding Material | Welding Process | Results of Chemical Analysis (weight %, Fe: bal.) | | | | | | | | | | | ☆1 | ☆2 |
|---|---|---|---|---|---|---|---|---|---|---|---|---|---|---|---|---|
| | | | | C | Si | Mn | P | S | Ni | Nb | Zr | Al | O | Other | | |
| Examples of This Invention | | | | | | | | | | | | | | | | |
| AWJ1 | C1 | A1 | TIG | 0.15 | 0.16 | 0.65 | 0.005 | 0.004 | 35.4 | 1.42 | — | 0.003 | 0.004 | Ce: 0.002 | 0.192 | 0.0076 |
| AWJ2 | C1 | A1 | PAW | 0.11 | 0.11 | 0.58 | 0.004 | 0.003 | 35.8 | 1.33 | — | 0.003 | 0.004 | Ce: 0.001 | 0.192 | 0.0075 |
| AWJ3 | C1 | A2 | TIG | 0.49 | 0.08 | 0.12 | 0.012 | 0.002 | 31.1 | 0.76 | — | 0.006 | 0.004 | | 0.126 | 0.0066 |
| AWJ4 | C1 | A3 | TIG | 0.23 | 0.09 | 0.26 | 0.010 | 0.005 | 32.2 | — | 0.49 | 0.004 | 0.005 | | 0.099 | 0.0062 |
| AWJ5 | C1 | A4 | TIG | 0.28 | 0.19 | 0.45 | 0.004 | 0.003 | 37.9 | — | 1.93 | 0.008 | 0.003 | | 0.243 | 0.0084 |
| AWJ6 | C1 | A5 | TIG | 0.24 | 0.14 | 0.30 | 0.008 | 0.007 | 34.2 | 1.39 | 1.57 | 0.006 | 0.005 | | 0.346 | 0.0099 |
| AWJ7 | C1 | A6 | TIG | 0.04 | 0.08 | 0.14 | 0.002 | 0.001 | 41.6 | 0.40 | 0.13 | 0.004 | 0.009 | La: 0.008 | 0.103 | 0.0063 |
| AWJ8 | C1 | A7 | TIG | 0.07 | 0.04 | 0.15 | 0.001 | 0.002 | 39.5 | 0.04 | 0.13 | 0.003 | 0.007 | | 0.067 | 0.0057 |
| AWJ9 | C1 | A8 | TIG | 0.15 | 0.14 | 0.11 | 0.005 | 0.002 | 42.1 | 0.79 | 1.18 | 0.003 | 0.007 | Co: 5.02 | 0.217 | 0.0085 |
| AWJ10 | C1 | A9 | TIG | 0.08 | 0.40 | 0.48 | 0.012 | 0.004 | 36.1 | 2.00 | 1.86 | 0.002 | 0.002 | | 0.436 | 0.0113 |
| AWJ11 | C1 | A10 | TIG | 0.43 | 0.03 | 0.13 | 0.005 | 0.002 | 32.4 | 3.92 | — | 0.003 | 0.006 | Y: 0.001 La: 0.001 | 0.442 | 0.0114 |
| AWJ12 | C1 | A11 | TIG | 0.06 | 0.17 | 0.20 | 0.014 | 0.002 | 34.5 | 0.94 | 1.00 | 0.003 | 0.003 | | 0.244 | 0.0084 |
| AWJ13 | C1 | A12 | TIG | 0.05 | 0.09 | 0.60 | 0.007 | 0.007 | 44.1 | 1.31 | 0.50 | 0.002 | 0.004 | | 0.231 | 0.0082 |
| AWJ14 | C1 | A13 | TIG | 0.10 | 0.03 | 0.38 | 0.016 | 0.001 | 31.6 | 0.10 | 0.07 | 0.002 | 0.004 | | 0.067 | 0.0058 |
| AWJ15 | C1 | A14 | TIG | 0.16 | 0.20 | 0.18 | 0.003 | 0.001 | 36.1 | 2.95 | 0.11 | 0.004 | 0.005 | | 0.356 | 0.0101 |
| AWJ16 | C1 | A15 | TIG | 0.20 | 0.04 | 0.12 | 0.002 | 0.002 | 35.7 | — | 0.16 | 0.004 | 0.002 | | 0.066 | 0.0057 |
| AWJ17 | C1 | A15 | PAW | 0.18 | 0.03 | 0.16 | 0.002 | 0.003 | 36.1 | — | 0.08 | 0.003 | 0.002 | | 0.058 | 0.0056 |
| AWJ18 | C1 | B7 | TIG | 0.07 | 0.02 | 0.49 | 0.016 | 0.001 | 41.7 | 0.80 | 1.59 | 0.005 | 0.006 | Co: 1.11 | 0.289 | 0.0091 |
| AWJ19 | C1 | First layer A1 other layers A8 | TIG | 0.15 | 0.14 | 0.24 | 0.005 | 0.003 | 39.8 | 0.75 | 1.12 | 0.003 | 0.004 | | 0.237 | 0.0083 |
| AWJ20 | C2 | A3 | TIG | 0.25 | 0.10 | 0.36 | 0.010 | 0.005 | 32.0 | 0.21 | 0.48 | 0.003 | 0.005 | Co: 0.41 | 0.119 | 0.0065 |

Note)
☆1: 0.1(Nb + Zr) + 0.05
☆2: 0.0015(Nb + Zr) + 0.0055

TABLE 7

Evaluation Results of Welded Joint Properties

| Mark | Carbide Rate(%) | Nb + Zr Content in Carbide(%) | Evaluation Results of Reheat Cracking | Impact Values at −196° C. (J/cm²) | Results of U-bend Test |
|---|---|---|---|---|---|
| Examples of This Invention | | | | | |
| AWJ1 | 23.2 | 72.1 | ○ | 62 | ○ |
| AWJ2 | 23.6 | 70.6 | ○ | 66 | ○ |

TABLE 7-continued

Evaluation Results of Welded Joint Properties

| Mark | Carbide Rate(%) | Nb + Zr Content in Carbide(%) | Evaluation Results of Reheat Cracking | Impact Values at −196° C. (J/cm²) | Results of U-bend Test |
|---|---|---|---|---|---|
| AWJ13 | 15.8 | 62.1 | ○ | 57 | ○ |
| AWJ14 | 0.8 | 63.6 | ○ | 120 | ○ |
| AWJ15 | 28.9 | 60.5 | ○ | 47 | ○ |
| AWJ16 | 0.7 | 60.8 | ○ | 112 | ○ |

TABLE 7-continued

Evaluation Results of Welded Joint Properties

| Mark | Carbide Rate(%) | Nb + Zr Content in Carbide(%) | Evaluation Results of Reheat Cracking | Impact Values at −196° C. (J/cm²) | Results of U-bend Test |
|---|---|---|---|---|---|
| AWJ17 | 0.5 | 66.1 | ○ | 126 | ○ |
| AWJ18 | 13.3 | 65.9 | ○ | 61 | ○ |
| AWJ19 | 16.6 | 70.3 | ○ | 60 | ○ |
| AWJ20 | 20.1 | 73.1 | ○ | 58 | ○ |

Note 2)
"○" indicates no cracking in the columns of "Evaluation Result of Reheat Cracking" and "Result of U-bend Test"

TABLE 9-continued

Evaluation Results of Welded Joint Properties

| Mark | Carbide Ratio (%) | Nb + Zr content in Carbide (%) | Evaluation Results of Reheat Cracking | Impact Values at −196° C. (J/cm²) | Results of U-bend Test |
|---|---|---|---|---|---|
| BWJ11 | 26.7 | 70.6 | X* | 51 | X* |
| BWJ12 | 22.3 | 63.1 | X* | 71 | X* |

Note 1)
The mark * indicates that an intended level was not attained.
Note 2)
"○" indicates no cracking and "X" indicates cracking in the columns of "Evaluation Results of Reheat Cracking" and "Results of U-bend Test."

TABLE 8

Analysis Results of Weld Metal

| Mark | Base Metal | Welding Material | Welding Process | C | Si | Mn | P | S | Ni | Nb | Zr | Al | O | Other | ☆1 | ☆2 |
|---|---|---|---|---|---|---|---|---|---|---|---|---|---|---|---|---|
| Comparative Examples | | | | | | | | | | | | | | | | |
| BWJ1 | C1 | B1 | TIG | 0.15 | 0.10* | 0.54 | 0.003 | 0.003 | 36.5 | 0.38 | — | 0.003 | 0.003 | | 0.088* | 0.0061 |
| BWJ2 | C1 | B1 | PAW | 0.12 | 0.08* | 0.50 | 0.003 | 0.003 | 36.1 | 0.22 | — | 0.003 | 0.003 | | 0.072* | 0.0058 |
| BWJ3 | C1 | B2 | TIG | 0.21 | 0.22* | 0.45 | 0.013 | 0.004 | 39.7 | 0.95 | 0.70 | 0.002 | 0.003 | | 0.120* | 0.0080 |
| BWJ4 | C1 | B3 | TIG | 0.06 | 0.12 | 0.05 | 0.007 | 0.008* | 44.1 | 0.48 | 0.46 | 0.001 | 0.002 | Co: 7.61 | 0.144 | 0.0069* |
| BWJ5 | C1 | B4 | TIG | 0.18 | 0.20 | 0.17 | 0.005 | 0.009* | 31.2 | 1.45 | 0.48 | 0.003 | 0.004 | | 0.243 | 0.0084* |
| BWJ6 | C1 | B6 | TIG | 0.15 | 0.07 | 0.23 | 0.014 | 0.001 | 41.0 | — | 4.04* | 0.002 | 0.003 | La: 0.39 | 0.454 | 0.0116 |
| BWJ7 | C1 | B8 | TIG | 0.36 | 0.12* | 0.10 | 0.003 | 0.006* | 31.7 | 0.11 | 0.07 | 0.004 | 0.006 | | 0.074* | 0.0057* |
| BWJ8 | C1 | B9 | TIG | 0.23 | 0.22* | 0.14 | 0.003 | 0.002 | 41.0 | — | 1.36 | 0.002 | 0.002 | | 0.186* | 0.0075 |
| BWJ9 | C1 | B10 | TIG | 0.46 | 0.12 | 0.72* | 0.009 | 0.002 | 34.8 | 0.50 | 0.53 | 0.003 | 0.004 | | 0.153 | 0.0070 |
| BWJ10 | C1 | B12 | TIG | 0.07 | 0.03 | 0.65 | 0.005 | 0.009* | 40.0 | 0.06 | 1.54 | 0.003 | 0.004 | | 0.218 | 0.0079* |
| BWJ11 | C1 | B13 | TIG | 0.10 | 0.04 | 0.52 | 0.010 | 0.010* | 38.4 | 0.95 | 0.90 | 0.003 | 0.006 | | 0.235 | 0.0083* |
| BWJ12 | C1 | B14 | TIG | 0.20 | 0.16* | 0.30 | 0.005 | 0.001 | 39.1 | 0.94 | — | 0.011* | 0.003 | | 0.144* | 0.0069 |

Note 1)
The mark * after each numerical value indicates that the value is out of the range defined in the present invention.
Note 2)
☆1: 0.1(Nb + Zr) + 0.05
☆2: 0.0015(Nb + Zr) + 0.0055

TABLE 9

Evaluation Results of Welded Joint Properties

| Mark | Carbide Ratio (%) | Nb + Zr content in Carbide (%) | Evaluation Results of Reheat Cracking | Impact Values at −196° C. (J/cm²) | Results of U-bend Test |
|---|---|---|---|---|---|
| Comparative Examples | | | | | |
| BWJ1 | 0.4* | 63.1 | X* | 89 | X* |
| BWJ2 | 0.7 | 72.1 | X* | 93 | X* |
| BWJ3 | 6.9 | 70.3 | X* | 60 | X* |
| BWJ4 | 5.4 | 68.2 | X* | 72 | X* |
| BWJ5 | 28.4 | 69.3 | X* | 65 | X* |
| BWJ6 | 52.3* | 70.6 | ○ | 22* | ○ |
| BWJ7 | 9.4 | 74.3 | X* | 100 | X* |
| BWJ8 | 18.7 | 67.1 | X* | 63 | X* |
| BWJ9 | 13.6 | 64.2 | ○ | 20* | ○ |
| BWJ10 | 30.5 | 63.6 | X* | 55 | X* |

Industrial Applicability

The welded structure of the present invention has a weld metal free from cracking and achieving an excellent low temperature toughness and stress corrosion cracking resistance. The welding material of the present invention can be readily manufactured and provides a sufficient weldability in fabrication so that circulating welding or automatic welding in all positions can be carried out by using this welding material.

The present invention contributes greatly to the production of welded pipes using Fe—Ni low thermal expansion coefficient alloy as a raw material thereof, pipelines formed by jointing such welded pipes, and welded structures, including storage tanks and peripheral equipments thereof, which handle cryogenic substances, such as liquefied natural gas.

What is claimed is:

1. A welded structure having members jointed each other by welding, at least one of said members formed of Fe—Ni-base low thermal expansion coefficient alloy, a weld metal of the welded joint of said welded structure, comprising, on the weight % basis, Ni: 30 to 45%, Co: 0 to 10%, C: 0.03 to 0.5%, Mn: 0.7% or less, either one of or the total of Nb and Zr: 0.05 to 4%, and rare earth element: 0 to 0.5%, P as an impurity: 0.02% or less, Al as an impurity: 0.01% or less, and oxygen as an impurity: 0.01% or less, wherein each of Si and S satisfies the following formulas ① and ②;

$$Si \leq 0.1(Nb+Zr)+0.05\% \qquad ①$$

$$S \leq 0.0015(Nb+Zr)+0.0055\% \qquad ②$$

where each element symbol in said formulas ① and ② indicates the content (weight %) of each element.

2. A welded structure according to claim 1, wherein said weld metal includes a carbide existing in columnar crystal grain boundaries therein, said carbide is 0.5 to 50 volume % of said weld metal, and Nb and/or Zr in said carbide is 20 weight % or more of said carbide.

3. A welded pipe made of Fe—Ni low thermal expansion coefficient alloy characterized in that a weld metal of the welded joint comprising, on the weight % basis, Ni: 30 to 45%, Co: 0 to 10%, C: 0.03 to 0.5%, Mn: 0.7% or less, either one of or the total of Nb and Zr: 0.05 to 4%, and rare earth element: 0 to 0.5%, P as an impurity: 0.02% or less, Al as an impurity: 0.01% or less, and oxygen as an impurity: 0.01% or less, wherein each of Si and S satisfies the following formulas ① and ②;

$$Si \leq 0.1(Nb+Zr)+0.05\% \qquad ①$$

$$S \leq 0.0015(Nb+Zr)+0.0055\% \qquad ②$$

where each element symbol in said formulas ① and ② indicates the content (weight %) of each element.

4. A welded pipe according to claim 3, wherein said weld metal includes a carbide existing in columnar crystal grain boundaries therein, said carbide is 0.5 to 50 volume % of said weld metal, and Nb and/or Zr in said carbide is 20 weight % or more of said carbide.

5. A welding material of Fe—Ni low thermal expansion coefficient Fe-base alloy, comprising, on the weight % basis, C: 0.5% or less, Ni: 30 to 45%, Co: 0 to 10%, Mn: 0.7% or less, either one of or the total of Nb and Zr: 0.2 to 4%, and rare earth element: 0 to 0.5%, P as an impurity: 0.02% or less, Al as an impurity: 0.01% or less, and oxygen as an impurity: 0.01% or less, wherein said welding material satisfies all of the following formulas 1 to 6;

$$Si \leq 0.1(Nb+Zr)+0.05\% \qquad ①$$

$$S \leq 0.0015(Nb+Zr)+0.0055\% \qquad ②$$

$$C \geq 0.015(Nb+Zr)+0.04\% \qquad ③$$

$$0.1 \leq (Si/Mn) \leq 2 \qquad ④$$

$$S+O \leq 0.015\% \qquad ⑤$$

$$Al+O \leq 0.015\% \qquad ⑥$$

where each element symbol in said formulas ① and ⑥ indicates the content (weight %) of each element.

6. A welded structure according to claim 1, wherein the Fe—Ni—base low thermal expansion coefficient alloy includes at least one of Ti, Ta, Cr, Mo, Hf and Nd and the weld metal includes 0.5 weight % or less of Ti, Ta, Cr, Mo Hf and/or Nd.

7. A welded pipe according to claim 3, wherein the Fe—Ni—base low thermal expansion coefficient alloy includes at least one of Ti, Ta, Cr, Mo, Hf and Nd and the weld metal includes 0.5 weight % or less of Ti, Ta, Cr, Mo, Hf and/or Nd.

8. A welded structure according to claim 1, wherein at least one other of said members comprises stainless steel.

9. A welded structure according to claim 1, wherein the Fe—Ni—base low thermal expansion coefficient alloy comprises, in weight%, 30 to 45% Ni, up to 10% Co, up to 1.0% Mn, up to 1.0% Si, 0.2 <C $\leq$ 0.5%, 0.5<Nb $\leq$ 2.0%, up to 0.5% rare earth element, up to 0.01% S, up to 0.01% P, up to 0.01% Al, up to 0.1% O, with S, O and Nb satisfying the formula:

$$S+O \leq (0.005)(Nb)+0.01\%,$$

Wherein S, O and Nb represent weight % of each element.

* * * * *